US010178024B2

(12) United States Patent
Chopra et al.

(10) Patent No.: US 10,178,024 B2
(45) Date of Patent: Jan. 8, 2019

(54) TRAFFIC FORWARDING IN A NETWORK WITH GEOGRAPHICALLY DISPERSED SITES

(71) Applicant: NICIRA, INC., Palo Alto, CA (US)

(72) Inventors: Amit Chopra, Pune (IN); Sandeep Kasbe, Pune (IN); Prasad Potdar, Pune (IN)

(73) Assignee: NICIRA, INC., Palo Alto, CA (US)

( * ) Notice: Subject to any disclaimer, the term of this patent is extended or adjusted under 35 U.S.C. 154(b) by 121 days.

(21) Appl. No.: 14/841,730

(22) Filed: Sep. 1, 2015

(65) Prior Publication Data
US 2016/0380893 A1 Dec. 29, 2016

(30) Foreign Application Priority Data
Jun. 26, 2015 (IN) .......................... 3245/CHE/2015

(51) Int. Cl.
*H04L 12/741* (2013.01)
*H04L 29/12* (2006.01)
*H04L 12/26* (2006.01)

(52) U.S. Cl.
CPC .............. *H04L 45/74* (2013.01); *H04L 43/12* (2013.01); *H04L 61/103* (2013.01); *H04L 61/6022* (2013.01)

(58) Field of Classification Search
CPC ........ H04L 45/74; H04L 43/12; H04L 61/103
See application file for complete search history.

(56) References Cited

U.S. PATENT DOCUMENTS

| 2009/0037555 | A1* | 2/2009 | Ueno | G06F 3/0604 709/213 |
| 2012/0173757 | A1* | 7/2012 | Sanden | G06F 9/45558 709/238 |
| 2014/0022936 | A1* | 1/2014 | Robitaille | H04L 61/2007 370/254 |
| 2014/0376550 | A1* | 12/2014 | Khan | H04L 45/74 370/392 |
| 2015/0010001 | A1* | 1/2015 | Duda | H04L 45/74 370/392 |
| 2015/0117256 | A1* | 4/2015 | Sabaa | H04L 49/15 370/254 |
| 2016/0021032 | A1* | 1/2016 | Maier | H04L 49/70 370/401 |

* cited by examiner

*Primary Examiner* — Brandon M Renner
*Assistant Examiner* — Jay L Vogel
(74) *Attorney, Agent, or Firm* — Su IP Consulting

(57) ABSTRACT

An example method is provided for a first edge device to perform traffic forwarding in a network with geographically dispersed first site and second site. The method may comprise reconfiguring, for a workload migrated from the second site to the first site, the first edge device located at the first site as a default gateway of the workload from the second edge device located at the second site by causing the workload to learn an association between a default gateway Internet Protocol (IP) address associated with the second edge device to a Media Access Control (MAC) address associated with the first edge device. The method may further comprise receiving, from the workload, traffic for forwarding to a destination, and in response to determination that the destination is not within the second site, forwarding the received traffic to the destination without using the second edge device.

22 Claims, 9 Drawing Sheets

TRAFFIC FORWARDING IN A NETWORK WITH GEOGRAPHICALLY DISPERSED SITES

RELATED APPLICATIONS

Benefit is claimed under 35 U.S.C. 119(a)-(d) to Foreign application Serial No. 3245/CHE/2015 filed in India entitled "TRAFFIC FORWARDING IN A NETWORK WITH GEOGRAPHICALLY DISPERSED SITES", on Jun. 26, 2015, by Nicira, Inc., which is herein incorporated in its entirety by reference for all purposes.

BACKGROUND

Unless otherwise indicated herein, known approaches described are not admitted to be prior art by inclusion throughout the present disclosure.

The virtualization of computing resources provides opportunities for cloud service providers to sell virtual resources such as compute and storage resources to enterprises. For example, by purchasing additional resources from a cloud service provider, an enterprise may run some workloads (e.g., virtual machines, etc.) at an enterprise site while other workloads are migrated to the provider site that might be geographically dispersed from the enterprise site. In various forms, this general model of computing, known as "cloud computing", helps to reduce the costs of building, running and maintaining physical computing systems at the enterprise site. In networks with geographically dispersed sites, it is desirable for both the enterprise site and the service provider site to work as seamlessly with each other as possible, and for traffic forwarding to be performed in an efficient manner.

DETAILED DESCRIPTION

Figure 1:
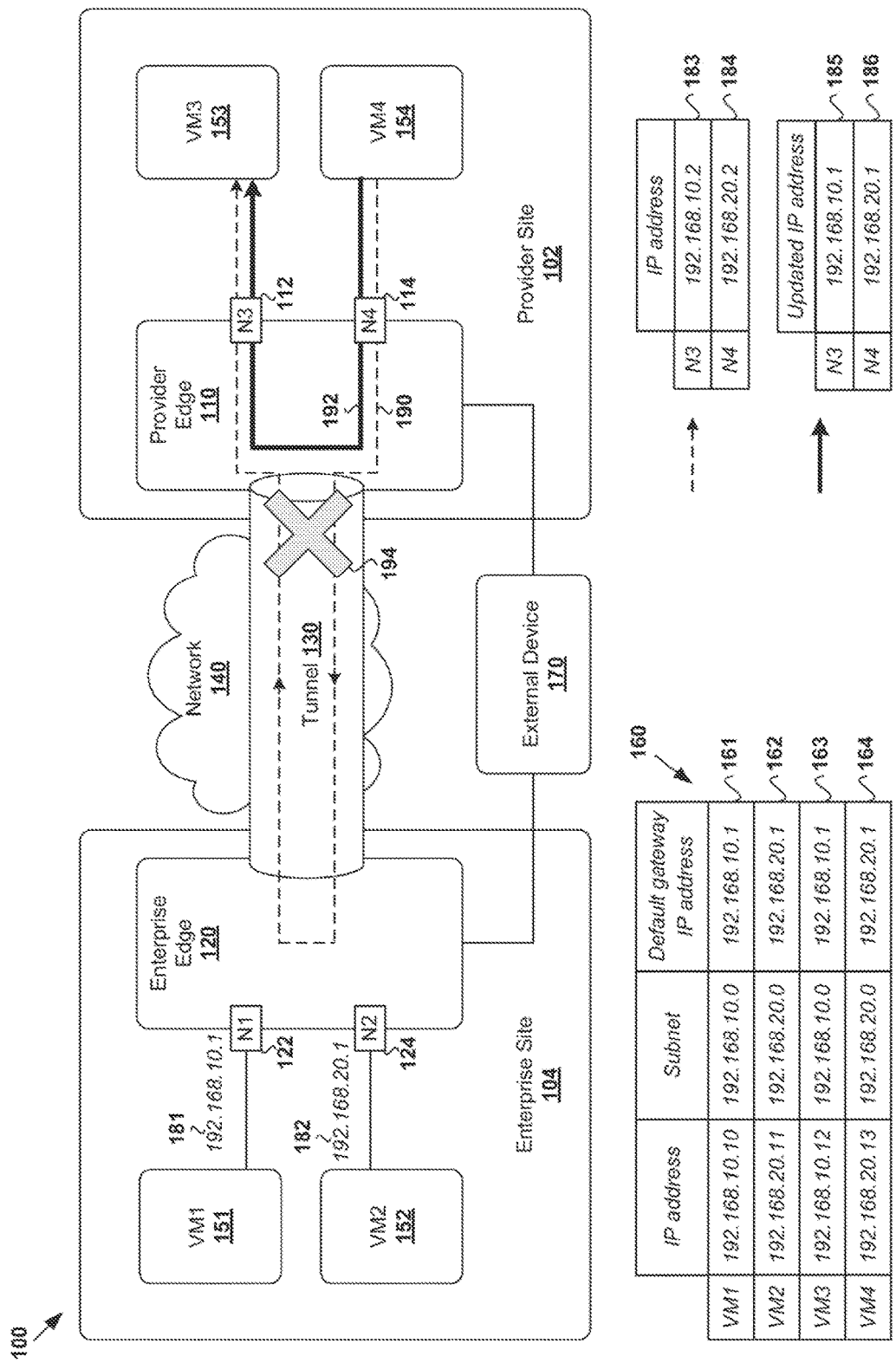
FIG. 1 is a schematic diagram of an example network with geographically dispersed sites according to a first example traffic forwarding scenario.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It ill be readily understood that the aspects of the present disclosure, as generally described herein, and illustrated in the drawings, can be arranged, substituted, combined, and designed in a wide variety of different configurations, all of which are explicitly contemplated herein.

The inefficiency of traffic, forwarding in networks with geographically dispersed sites will be explained using FIG. 1, which is a schematic diagram of example network 100 with geographically dispersed sites 102, 104 according to a first traffic forwarding scenario. It should be understood that example network 100 may include additional or alternative components than that shown, depending on the desired implementation.

In the example in FIG. 1, network 100 may represent an extended layer-2 network that includes provider site 102 and enterprise site 104 interconnecting via tunnel 130. Provider edge 110 (also known as "provider edge device") is located at the edge of provider site 102 to forward ingress traffic to, and egress traffic from, provider site 102. Enterprise edge 120 (also known as "enterprise edge device" or "customer edge device") is located at the edge of enterprise site 104 is to forward ingress traffic to, and egress traffic, from enterprise site 104. In practice, provider edge 110 and enterprise edge 120 may be implemented using one or more virtual or physical entities capable of performing functionalities of switches, routers, bridges, any combination thereof, etc.

To provide connectivity between provider edge 110 and enterprise edge 120, tunnel 130 (e.g., secure socket layer (SSL) tunnel, etc.) may be implemented over any suitable layer-3 network 140. Here, the term "tunnel" is used generally to describe an end-to-end, bi-directional communication path between provider edge 110 and enterprise edge 120. Any suitable technologies may be used in network 100, such as Generic Routing Encapsulation (GRE), Generic Network Virtualization Encapsulation (GENEVE), Network Virtualization using Generic Routing Encapsulation (NVGRE), Stateless Transport Tunnel (STT), Multi-Protocol Label Switching (MPLS), Virtual eXtensible Local Area Network (VXLAN), Layer-2 Virtual Private Network (L2VPN), etc. For example, VXLAN may be implemented to allow the virtual machines (e.g., "VM2" 152 and "VM4" 154) to participate in a logical layer-2 subnet that operates across multiple layer-3 networks. As used herein, the term "layer-2" generally refers to a Media Access Control (MAC) layer and "layer-3" to a network layer in the Open System Interconnection (OSI) model, although the concepts described herein may be applicable to other layers and/or other networking model.

Example network 100 in FIG. 1 further includes virtual machines 151-154 to support various applications and services. For example, "VM1" 151 and "VM2" 152 are located within enterprise site 104 and connected to enterprise edge 120 via respective interfaces 122 and 124. On the other hand, "VM3" 153 and "VM4" 154 are migrated from enterprise site 104 to provider site 102 and connected to provider edge 110 via respective interfaces 112 and 114. In practice, "interface" 112, 114, 122, 124 may represent any suitable component capable of providing network connection, such as a port, physical or virtual network interface card (NIC), etc. Although not shown for simplicity, virtual machines 151-154 are implemented using physical computing systems (also known as hosts and servers). To support multiple virtual machines, each physical computing system may execute virtualization software (e.g., hypervisor) to maintain a mapping between virtual resources allocated to the virtual machines and physical resources of underlying hardware. "VM3" 153 and "VM4" 154 may reside on different hosts or the same host in provider site 102; likewise, "VM1" 151 and "VM2" 152 may reside on different hosts or the same host in enterprise site 104.

Although examples of the present disclosure refer to "virtual machines" should be understood that virtual machines running within a virtualization environment are merely one example of "Workloads". In general, a workload may represent an addressable data compute node or isolated user space instance. In practice, any suitable technologies aside from hardware virtualization may be used to provide isolated user space instances. For example, other workloads may include physical hosts, client computers, containers (e.g., running on top of a host operating system without the need for a hypervisor or separate operating system), virtual private servers, etc. The virtual machines may also be complete computation environments, containing virtual equivalents of the hardware and system software components of a physical computing system.

After migrating from enterprise site 104 to provider site 102, "VM3" 153 and "VM4" 154 maintain their layer-3 address (e.g., IP address) to work as seamlessly as possible with "VM1" 151 and "VM2" 152 that remain at enterprise site 104. In some cases, they may also maintain their layer-2 address (e.g., MAC address). Referring to table 160, "VM3" 153 retains IP address=192.168.10.12 (see entry 163) and remains on the same first subnet=192.168.10.0 as "VM1" 151 with IP address=192.168.10.10 (see entry 161). Similarly, "VM4" 154 retains IP address=192.168.20.13 (see entry 164) and remains on the same second subnet=192.168.20.0 as "VM2" 152 with IP address=192.168.20.11 (see entry 162). Here, the term "subnet" refers generally to a portion of a network that shares a common address component. In practice, network 100 may be divided into various subnets (only two shown for simplicity) for security and performance reasons, etc.

After migrating from enterprise site 104 to provider site 102, "VM3" 153 and "VM4" 154 also maintain their default gateway IP address as if they were still at enterprise site 104. Here, the term "default gateway" refers to any suitable device, component, etc., that serves as an access point to another network (e.g., another subnet, another site, etc.). In the example in FIG. 1, "VM1" 151 and "VM3" 153 on the same first subnet=192.168.10.0 are both configured with a default gateway IP address=192.168.10.1 associated with interface "N1" 122 of enterprise edge 120 (see 181). On the other hand, "VM2" 152 and "VM4" 154 on the same second subnet=192.168.20.0 are both configured with a default gateway IP address=192.168.20.1 associated with interface "N2" 124 of enterprise edge 120 (see 182).

At provider site 102, "VM3" 153 and "VM4" 154 may be connected to respective interfaces "N3" 112 and "N4" 114 of provider edge 110. In the example in FIG. 1, provider edge 110 uses a different set of IP addresses than that used by enterprise edge 120, such as 192.168.10.2 (see 183) for interface "N3" 112 and 192.168.20.2 (see 184) for interface "N4" 114. In this case, "VM3" 153 will continue using enterprise edge 120 as its default gateway because its default gateway IP address=192.168.10.1 (see 163) is only present at enterprise site 104. Similarly, enterprise edge 120 remains as the default gateway for "VM4" 154 because its default gateway IP address=192.168.20.1 (see 164) is only present at enterprise site 104.

However, using enterprise edge 120 as the default gateway for "VM3" 153 and "VM4" 154 may not always be optimal for traffic forwarding in network 100. For example, in a first scenario shown in FIG. 1, when "VM4" 154 communicates with destination "VM3" 153, traffic 190 from "VM4" 154 (see dashed line in FIG. 1) would have to cross tunnel 130 twice. To reach its default gateway (i.e., enterprise edge 120), traffic 190 is first sent across tunnel 130 via provider edge 110. Since destination "VM3" 153 is not within enterprise site 104, enterprise edge 120 redirects traffic 190 across tunnel 130 back to provider edge 110 to reach "VM3" 153.

Figure 2:
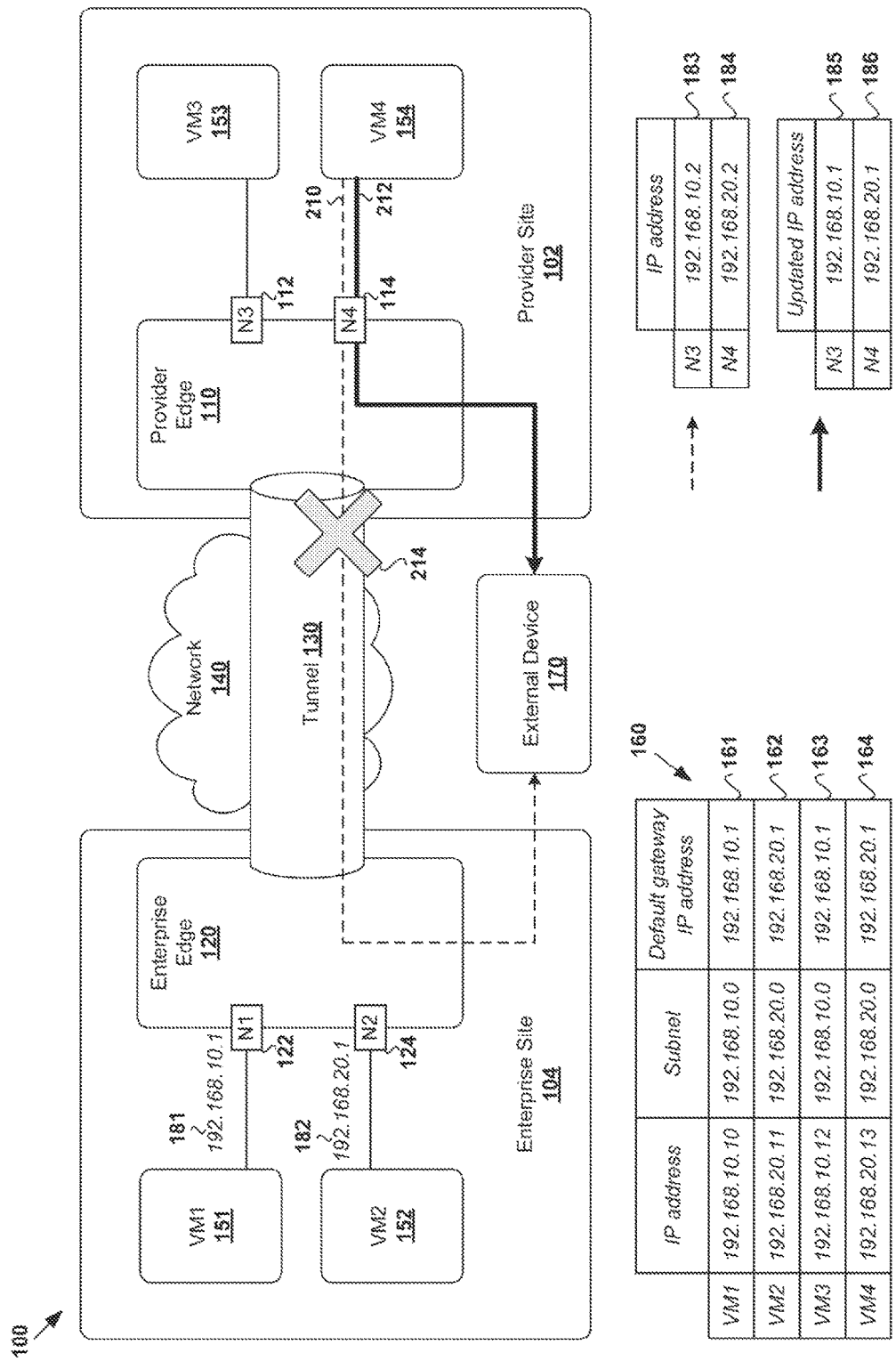
FIG. 2 is a schematic diagram of the example network in FIG. 1 according to a second example traffic forwarding scenario.

Another example is shown in FIG. 2, which is a schematic diagram of example network 100 in FIG. 1 according to a second example traffic forwarding scenario. Here, "VM4" 154 wishes to communicate with external device 170 (e.g., a web server on the Internet, etc.) that is located outside of both sites 102, 104. In this case, traffic 210 (see dashed line in FIG. 2) from "VM4" 154 is sent via provider edge 110 all the way across tunnel 130 to its default gateway of enterprise edge 120. This is performed even though provider edge 110 may forward traffic directly to external device 170 (e.g., via other intermediate devices not shown for simplicity). In both scenarios in FIG. 1 and FIG. 2, inefficient traffic forwarding leads to bandwidth wastage and higher latency for traffic 190, 210. Further, provider edge 110 wastes its own processing resources and that of enterprise edge 120 for sending unnecessary traffic 190, 210 across tunnel 130.

Figure 3:
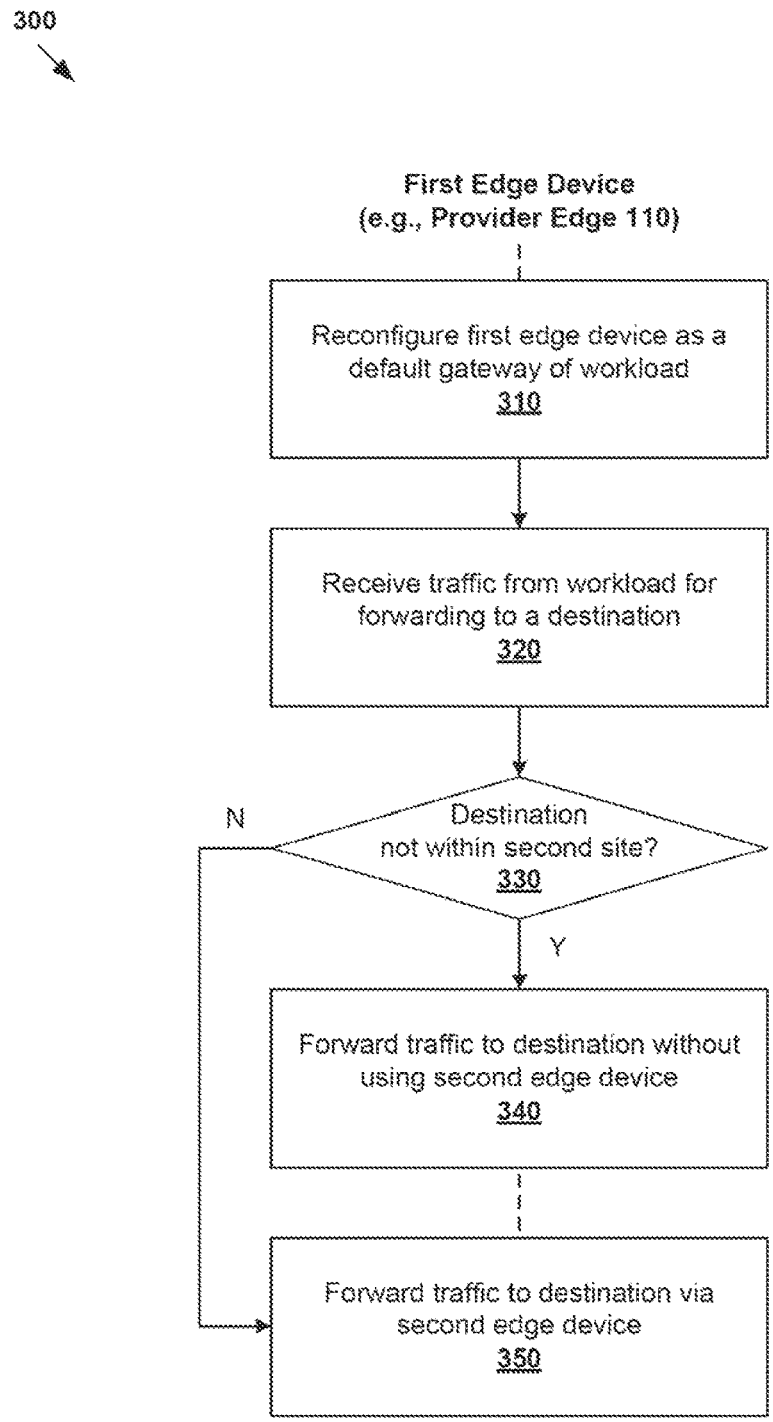
FIG. 3 is a flow chart of an example process to perform traffic forwarding in a network with geographically dispersed sites.

According to examples of the present disclosure, traffic forwarding in network 100 may be improved by reconfiguring the default gateway of "VM3" 153 and "VM4" 154 from enterprise edge 120 to provider edge 110. This reduces unnecessary traffic forwarding to enterprise edge 120 and improves resource utilization in network 100. In more detail, FIG. 3 is a flow chart of an example process 300 to perform traffic forwarding in network 100 with geographically dispersed sites 102, 104. Example process 300 may include one or more operations, functions, or actions illustrated by one or more blocks, such as blocks 310 to 350. The various blocks may be combined into fewer blocks, divided into additional blocks, and/or eliminated based upon the desired implementation.

Example process 300 may be implemented by any suitable edge device, such as provider edge 110 at provider site 102, etc. In the following examples, example process 300 will be explained using provider edge 110 as an example "first edge device", enterprise edge 120 as an example "second edge device", provider site 102 as an example "first site", enterprise site 104 as an example "second site", "VM4" 154 as an example "workload", In practice, the roles of "first edge device" and "second edge device" may be performed by any suitable pair of edge devices located at any suitable geographically dispersed sites.

At 310 in FIG. 3, for a workload (e.g., "VM4" 154) migrated from enterprise site 104 to provider site 102, provider edge 110 located at provider site 102 is reconfigured as a default gateway of the workload from enterprise edge 120 located at enterprise site 104. For example, the reconfiguration may be performed during an address resolution process to resolve a default gateway IP address associated with enterprise edge 120 (e.g., 192.168.20.1 for "VM4" 154) to a MAC address associated with provider edge 110 (e.g., MAC-PE2). The reconfiguration causes the workload e.g., "VM4") to learn an association between the default gateway IP address (e.g., 192.168.20.1 and the MAC address (e.g., MAC-PE2) for subsequent traffic forwarding.

As will be explained further using FIG. 4 and FIG. 5, IP addresses associated with interfaces "N3" 112 and "N4" 114 of provider edge 110 may also be configured based on IP addresses associated with respective interfaces "N1" 122 and "N2" 124 of enterprise edge 120. In the example in FIG. 1, the IP address of interface "N3" 112 of provider edge 110 may be updated from 192.168.10.2 (see 183) to 192.168.10.1 (see 185) to correspond with the IP address of "N1" 122 (see 181). Similarly, the IP address of interface "N4" 114 of provider edge 110 may be updated from 192.168.20.2 (see 184) to 192.168.20.1 (see 186) to correspond with the IP address of "N2" 124 (see 182).

It should be understood that the default gateway reconfiguration at 310 in FIG. 3 is performed by provider edge 110, which should be contrasted with manual configuration. For example, manual configuration generally involves a network administrator manually updating the default gateway settings of each and every migrated workload in network 100. This is inefficient and time consuming because each migrated workload has to be updated separately, such as via a graphical user interface, command line interface, etc. The administrative overheads associated with the manual configuration also increases as the number of workloads migrating from enterprise site 104 to provider site 102 increases to hundreds or thousands. Also, until the manual configuration is performed, traffic forwarding may continue to be performed inefficiently. The default gateway reconfiguration at 310 should also be contrasted with approaches that require changes to the host on which the workload resides. Such approaches are usually only suitable for greenfield development (i.e., developed in a totally new environment) because they introduce significant overheads and are infeasible for provider site 102 with a large number of hosts to upgrade. In contrast, the default gateway reconfiguration at 310 is suitable for use in both greenfield and brownfield (i.e., requires integration with legacy systems and hosts) developments. In practice, "VM1" 151, "VM2" 152, "VM3" 153 and "VM4" 154 may each be on any suitable logical layer-2 segment, such as Virtual Local Area Network (VLAN) and VXLAN.

At 320 in FIG. 3, provider edge 110 receives traffic from the workload (e.g., "VM4" 154) for forwarding to a destination (e.g., "VM3" 153, "VM1" 151 or external device 170). To use provider edge 110 as the default gateway, the received traffic is addressed by the workload to the MAC address associated with provider edge 110 based on the association between the default gateway IP address associated with enterprise edge 120 (e.g., 192.168.20.1 for "VM4" 154) and the MAC address associated with provider edge 110 (e.g., MAC-PE2). As used herein, the term "traffic" may refer generally to a group of bits that can be transported together from a source to a destination, such as in the form of packets, frames, messages, datagrams, etc.

At 330 and 340 in FIG. 3, in response to determination that the destination is not within enterprise site 104, provider edge 110 forwards the received traffic to the destination without using enterprise edge 120. Otherwise, at 330 and 350 in FIG. 3, provider edge 110 forwards the received traffic to the destination via enterprise edge 120.

Using example process 300 in the first example traffic forwarding scenario in FIG. 1, provider edge 110 forwards traffic 192 (shown in bold line in FIG. 1) to "VIM" 153 without using enterprise edge 120. This has the effect of blocking (see 194) traffic 192 from crossing tunnel 130. Similarly, in the second example traffic forwarding scenario in FIG. 2, provider edge 110 forwards traffic 212 (shown in bold line in FIG. 2) from "VM4" 154 to external device 170 without using enterprise edge 120, thereby blocking (see 214) traffic 212 from crossing tunnel 130. In both scenarios in FIG. 1 and FIG. 2, "VM3" 153 and "VM4" 154 may still retain their IP addresses and default gateway IP addresses (see 163 and 164) to work seamlessly with "VM1" 151 and "VM2" 152 at enterprise site 104.

Example process 300 may be implemented to facilitate egress optimization where traffic forwarding is performed on the shortest path between a source and a destination. Here, the term "egress optimization" may refer generally to optimized handling or routing of outbound traffic from "VM4" 154 to its destination via provider edge 110. From the perspective of provider edge 110, "VM3" 153 and "VM4" 154 at provider site 102 may represent a "local domain" while "VM1" 151 and "VM2" 152 represent a "remote domain". Using egress optimization, traffic forwarding within the local domain will be, where possible, given preference over traffic forwarding to the remote domain.

In the following, various examples of the present disclosure will be discussed with reference to FIG. 4, FIG. 5, FIG. 6 and FIG. 7. In particular, example default gateway reconfiguration will be discussed using FIG. 4 and FIG. 5, and example traffic forwarding using FIG. 6 (e.g., from "VM4" 154 to "VM3" 153), FIG. 7 (e.g., from "VM4" 154 to external device 170) and FIG. 8 (e.g., from "VM4" 154 to "VM1" 151).

Default Gateway Reconfiguration

As discussed using FIG. 1 and FIG. 2, enterprise edge 120 acts as the default gateway for both first subnet=192.168.10.0 and second subnet=192.168.20.0 at enterprise site 104. Prior to migration, "VM3" 153 is configured with default gateway IP address=192.168.10.1 (see 163 in table 160) and "VM4" 154 with default gateway IP address=192.168.20.1 (see 164 in table 160). After the migration, "VM3" 153 and "VM4" 154 usually retain their default gateway IP addresses such that the migration is transparent to the users. To be able to forward traffic to their default gateway, address resolution is initiated by "VM3" 153 and "VM4" 154 to resolve the default gateway IP addresses to their respective default gateway MAC addresses. The default gateway MAC addresses are required to encapsulate layer-3 packets to layer-2 frames in order to reach the default gateway.

In more detail, provider edge 110 and enterprise edge 120 conventionally have different internal IP addresses. For example, at enterprise edge 120, interface "N1" 122 is configured with IP address=192.168.10.1 (see 181) as the default gateway IP address for first subnet=192.168.10.0. Interface "N2" 124 is configured with IP address=192.168.20.1 (see 182) as the default gateway IP address for second subnet=192.168.20.0. However, at provider edge 110, different IP addresses are usually used. For example, interface "N3" 112 may be configured with IP address=192.168.10.2 (see 183) for first subnet=192.168.10.0 and interface "N4" 114 with IP address=192.168.20.2 (see 184) for second subnet=192.168.20.0. In this case, when "VM3" 153 and "VM4" 154 attempts to resolve their default gateway IP address, enterprise edge 120 will respond and remain as the default gateway. As shown in FIG. 1 and FIG. 2, this leads to unnecessary traffic forwarding (see 190 and 210) to enterprise edge 120.

To facilitate default gateway reconfiguration according to examples of the present disclosure, IP addresses of interfaces 112, 114 of provider edge 110 may be configured based on the IP addresses associated with interfaces 122, 124 of enterprise edge 120. In more detail, FIG. 4 is a flow diagram illustrating example process for default gateway reconfiguration in example network in FIG. 1 and FIG. 2. In this example, the implementation is illustrated using one or more operations, functions, or actions represented by 410 to 450. The various operations, functions, or actions may be combined, divided, and/or eliminated based upon the desired implementation.

Figure 4:
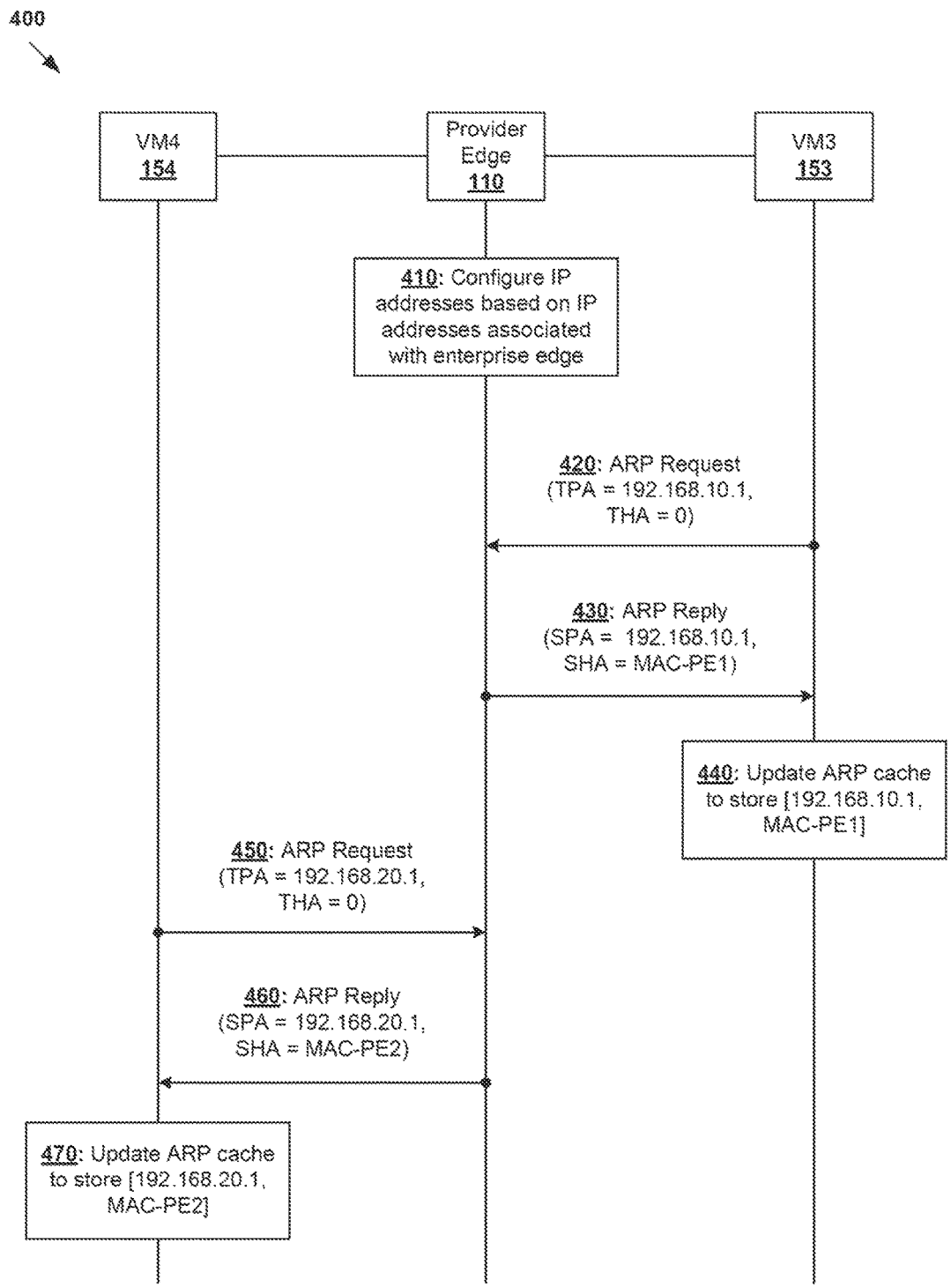
FIG. 4 is a flow diagram illustrating an example detailed process to perform default gateway reconfiguration in the example network in FIG. 1 and FIG. 2.

At 410 in FIG. 4, IP addresses associated with provider edge 110 may be configured to correspond with default gateway IP addresses associated with enterprise edge 120. In the example in FIG. 1 and FIG. 2, default gateway IP address=192.168.10.1 (see 181 in FIG. 1) is used for first subnet=192.168.10.0 at enterprise site 104. To allow "VM3" 153 to maintain this default gateway IP address after its migration, interface "N3" 112 connected to "VM3" 153 is also configured with the same IP address=192.168.10.1 (see 185 in FIG. 1) for the same first subnet at provider site 102.

Similarly, default gateway IP address=192.168.20.1 (see 182 in FIG. 1) is used for second subnet=192.168.20.0 at enterprise site 104. To allow "VM4" 154 to maintain this default gateway IP address after its migration, interface "N4" 114 connected to "VM4" 154 is also configured with the same IP address=192.168.201 (see 186 in FIG. 1) for the same second subnet=192.168.20.0 at provider site 102. The IP addresses 185, 186 may be configured or updated using any suitable approach, such as manually by a user (e.g., network administrator), programmatically, etc.

During an address resolution process at 420 to 440 in FIG. 4, the default gateway IP address (see 163 in table 160) of "VM3" 153 is resolved to a MAC address (e.g., MAC-PE1) associated with provider edge 110. Similarly, at 450 to 470, the default gateway IP address (see 164 in table 160) of "VM4" 154 is resolved to a MAC address (e.g., MAC-PE2) associated with provider edge 110. Any suitable protocol may be used during the address resolution process, such as Address Resolution Protocol (ARP) as shown in the examples in FIG. 4, Neighbor Discovery Protocol (NDP), etc.

Figure 5:
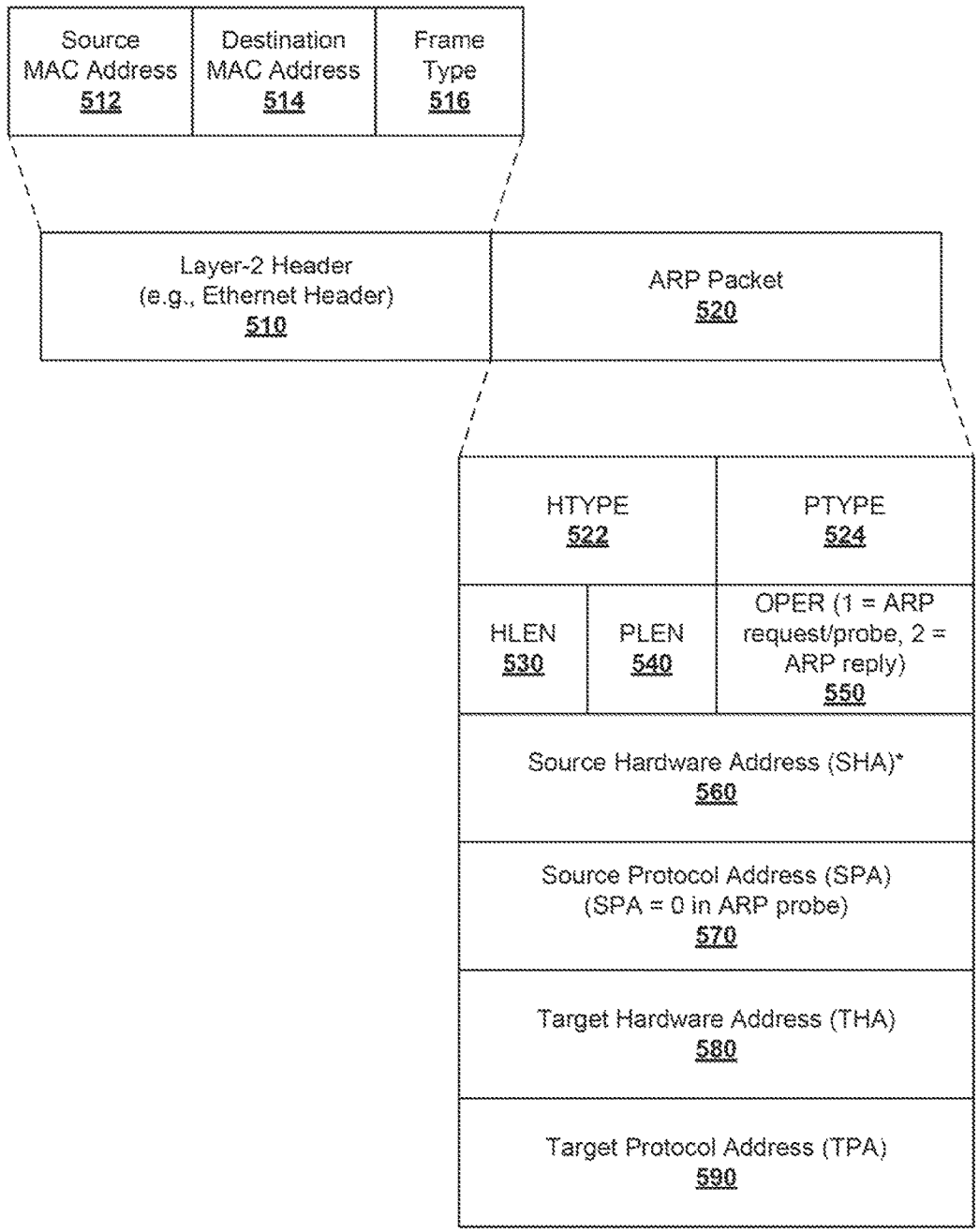
FIG. 5 is a schematic diagram of an example format of an Address Resolution Protocol (ARP) message encapsulated within a layer-2 header.

FIG. 5 is a schematic diagram of an example format 500 of ARP message 520 encapsulated within layer-2 header 510. Although an example is shown, header 510 and ARP message 520 may have additional or alternative fields. Layer-2 header 510 (e.g., Ethernet header) includes source MAC address 512, destination MAC address 514 and frame type 516 (e.g., 0x0806 for ARP messages). ARP message 520 includes hardware type (HTYPE) 522 to specify the type of hardware address (e.g., '1' for MAC address); protocol type (PTYPE) 524 to specify the type of network address (e.g., '0x0800' for IP version 4 (IPv4) address); hardware length (HLEN) 530 to specify the address length of the type specified in HTYPE (e.g., '6' octets for a MAC address); and protocol length (PLEN) to specify the address length of the type specified in PTYPE (e.g., '4' octets for an IPv4 address).

Further, ARP message 520 includes operation (OPER) 550 to specify the operation of message 500, such as '1' for an ARP request message or ARP probe message, or '2' for an ARP reply message. The payload of ARP message 500 may include four addresses, i.e., the hardware (e.g., layer-2) and protocol (e.g., layer-3) addresses of both the source and destination. At 560 and 570, source hardware address (SHA) is to specify the source MAC address, and source protocol address (SPA) to specify the source IP address. At 580 and 590, target hardware address (THA) is to specify the destination MAC address and target protocol address (TPA) to specify the destination IP address. ARP request and probe messages are broadcast messages, but the ARP reply messages are generally unicast messages.

During the address resolution process in FIG. 4, at 420, provider edge 110 receives an ARP request message from "VM3" 153 to resolve its default gateway IP address=192.168.10.1 at enterprise site 102. In this case, a layer-2 header (see 510 in FIG. 5) of the ARP request message may include source MAC address=MAC-VM3 (i.e., MAC address of "VM3" 153), destination MAC address=broadcast MAC address (e.g., FF:FF:FF:FF:FF:FF). The ARP request message may include SPA=192.168.10.12 (i.e., IP address of "VM3" 153), SHA=MAC-VM3 (i.e., MAC address of "VM3" 153). TPA=192.168.10.1 (i.e., default gateway IP address of "VM3" 153; see 163) and THA=0.

At 430 in FIG. 4, after determining that TPA=192.168.10.1 in the ARP request message matches with an IP address (see 185) associated with interface "N3" 112 of provider edge 110, an ARP reply message is generated and sent to "VM3" 153. The ARP reply message associates SPA=192.168.10.1 (i.e., default gateway IP address) with SHA=MAC-PE1 (i.e., MAC address of interface "N3" 112). In this case, the layer-2 header of the ARP reply message includes source MAC address=MAC-PE1 and destination MAC address=MAC-VM3.

At 440 in FIG. 4, in response to receiving the ARP reply message from provider edge 110, "VM3" 153 learns, and updates its local ARP cache (also known as ARP table) to store, the association between default gateway IP address=192.168.10.1 and default gateway MAC address=MAC-PE1. In subsequent communication, traffic sent by "VM3" 153 will be encapsulated in a layer-2 header that includes the default gateway MAC address=MAC-PE1 as the destination MAC address, i.e., its default gateway is reconfigured from enterprise edge 120 to provider edge 110.

Similar default gateway reconfiguration may be performed for "VM4" 154. At 450 in FIG. 4, provider edge 110 receives an ARP request message from "VM4" 154 that includes TPA=192.168.20.1 (i.e., default gateway IP address of "VM4" 154; see 164) and THA=0. The ARP request message is broadcasted by encapsulating it with a layer-2 header with source MAC address=MAC-VM3 (i.e., MAC address of "VM3" 153), destination MAC address=broadcast destination MAC address (e.g., FF:FF:FF:FF:FF:FF).

At 460 in FIG. 4, since TPA=192.168.20.1 in the ARP request message matches with an IP address (see 186) associated with interface "N4" 114 of provider edge 110, an ARP reply message is generated and sent to "VM4" 154. The ARP reply message associates SPA=192.168.20.1 (i.e., default gateway IP address) with SHA=MAC-PE2 (i.e., MAC address of interface "N4" 114). In this case, the layer-2 header includes source MAC address=MAC-PE2 and destination MAC address=MAC-VM4.

At 470 in FIG. 4, in response to receiving the ARP reply message from provider edge 110, "VM4" 154 learns, and updates its ARP cache to store, the association between default gateway IP address=192.168.20.1 and default gateway MAC address=MAC-PE2. In subsequent communication, traffic sent by "VM4" 154 are encapsulated in a layer-2 header that includes the default gateway MAC address=MAC-PE2 as the destination MAC address. Because MAC-PE2 uniquely identifies provider edge 110, the traffic sent by "VM4" 154 will reach provider edge 110, which then forwards the packets based on an upper layer destination address (e.g., destination IP address).

Example process 400 therefore allows "VM3" 153 and "VM4" 154 to retain their default gateway IP addresses after migrating from enterprise site 140 to provider site 102. Instead of sending ARP request messages (see 420 and 450) from "VM3" 153 and "VM4" 154 to enterprise edge 120, provider edge 110 "blocks" the ARP request messages from crossing tunnel 130. Instead, provider edge 110 resolves their default gateway IP addresses to MAC addresses associated with provider edge 110. This dynamically reconfigures provider edge 110 as the default gateway for "VM3" 153 and "VM4" 154.

Traffic Forwarding within Provider Site

Figure 6:
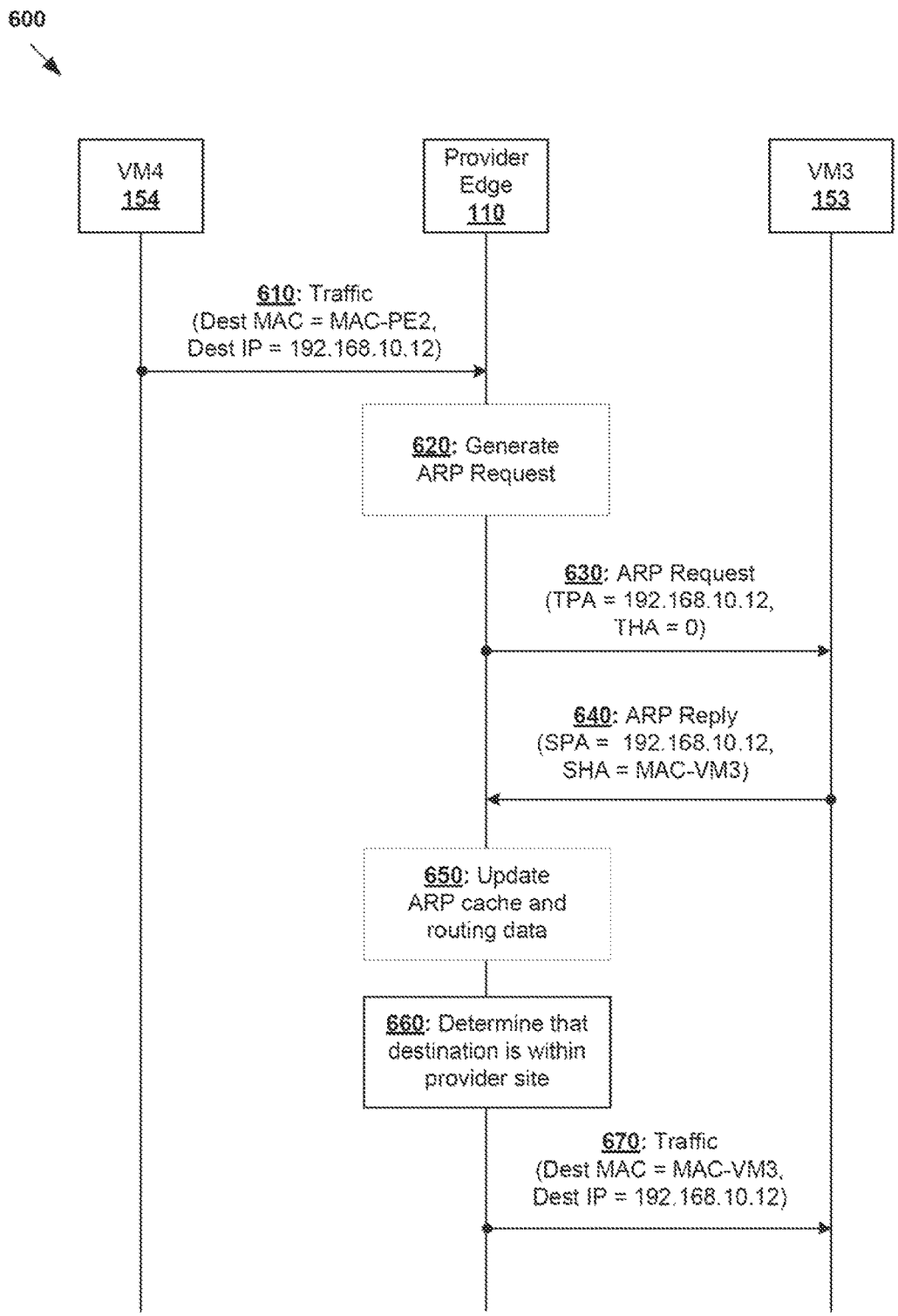
FIG. 6 is a flow diagram of an example process to perform traffic forwarding. according to the first example traffic forwarding scenario in FIG. 1 after default gateway reconfiguration.

FIG. 6 is a flow diagram of example process 600 to perform traffic forwarding according to the first example traffic forwarding scenario in FIG. 1 after default gateway reconfiguration. In this example, the implementation is illustrated using one or more operations, functions, or actions represented by 610 to 670. The various operations, functions, or actions may be combined, divided, and/or eliminated based upon the desired implementation. Example process 600 may be implemented to facilitate intra-site communication, such as when "VM4" 154 wishes to send traffic 192 (e.g., data packets) to "VM3" 153 within provider site 102.

At 610 in FIG. 6, "VM4" 154 wishes to send traffic (see 192 in FIG. 1) to destination "VM3" 153 having IP address=192.168.10.12. Since "VM3" 153 is on a different subnet (e.g., 192.168.10.0 instead of 192.168.20.0), "VM4" 154 sends the traffic to provider edge 110 serving as its default gateway for forwarding to "VM3" 153. To reach its default gateway and eventually "VM3" 153, the header data of the traffic includes destination IP address=192.168.10.12 (i.e., IP address of "VM3" 153, as well as destination MAC address=MAC-PE2 (i.e., MAC address of interface "N4" 114) and) based on the association learned and stored in its ARP cache at 470 in FIG. 4.

At 620 in FIG. 6, provider edge 110 receives the traffic from "VM4" 154 for forwarding to "VM3" 153. To be able to do so, provider edge 110 needs to how to reach "VM3" 153. For example, if the MAC address of "VM3" 153 is not present in a local ARP cache or routing data at provider edge 110, an ARP request message is generated to resolve the IP address of "VM3" 153 to a MAC address. In this case, the ARP request message is to resolve TPA=192.168.10.12 (i.e., IP address of "VM3" 153) to a MAC address. The ARP request message is broadcasted by encapsulating it with a broadcast destination MAC address.

Since the ARP request message is broadcasted, it will reach "VM3" 153 via provider edge 110. At 630 in FIG. 6, "VM3" 153 receives the ARP request message, checks that the TPA=192.168.10.12 in the ARP request message matches with its IP address, and responds with an ARP reply message. In the example in FIG. 6, the ARP reply message associates SPA=192.168.10.12 (i.e., IP address of "VM3" 153) with SHA=MAC-VM3 (i.e., MAC address of "VM3" 153).

The ARP reply message from "VM3" 153 is sent to provider edge 110. At 640 and 650 in FIG. 6, provider edge 110 receives the ARP reply message and updates its ARP cache that stores mapping data between MAC addresses and IP addresses. In this case, provider edge 110 adds the mapping between 192.168.10.12 (i.e., IP address of "VM3" 153) and MAC-VM3 (i.e., MAC address of "VM3" 153) to the ARP cache. Provider edge 110 may also update and store any suitable routing data based on the ARP reply message, such as to store the IP address of "VM3" 153 in association with interface "N3" 112 via which the ARP reply message is received from "VM3" 153.

At 660 in FIG. 6, provider edge 110 is ready to forward the traffic from "VM4" 154 to "VM3" 153. In this case, based on the ARP reply message, provider edge 110 determines that "VM3" 153 is within provider site 102 and reachable via interface "N3" 112. Therefore, it is not necessary to forward the traffic using tunnel 130. At 670, provider edge 110 forwards the traffic to "VM3" 153 via interface "N3" 112. This has the effect of blocking the traffic from crossing tunnel 130 (see also 192 and 194 in FIG. 1).

Although an example is shown in FIG. 6, it will be appreciated that it is not necessary to perform address resolution (see 620 to 650) every time traffic is sent from "VM4" 154 to "VM3" 153. In particular, provider edge 110 may rely on its updated ARP cache and routing data (see 650) for subsequent traffic forwarding between "VM4" 154 and "VM3" 153. Entries of the ARP cache are generally associated with a timeout value and only removed after a period of inactivity (e.g., minutes, hours, etc.).

Further, although the example in FIG. 6 shows provider edge 110 initiating the address resolution process at 620, "VM4" 154 may instead generates and sends the ARP request message to provider edge 110 before forwarding traffic to "VM3" 153 at 610. In this case, provider edge 110 may also learn and store the mapping between 192.168.10.12 (i.e., IP address of "VM3" 153) and MAC-VM3 (i.e., MAC address of "VM3" 153) when "VM3" 153 responds with an ARP reply message.

Traffic Forwarding to External Device

Figure 7:
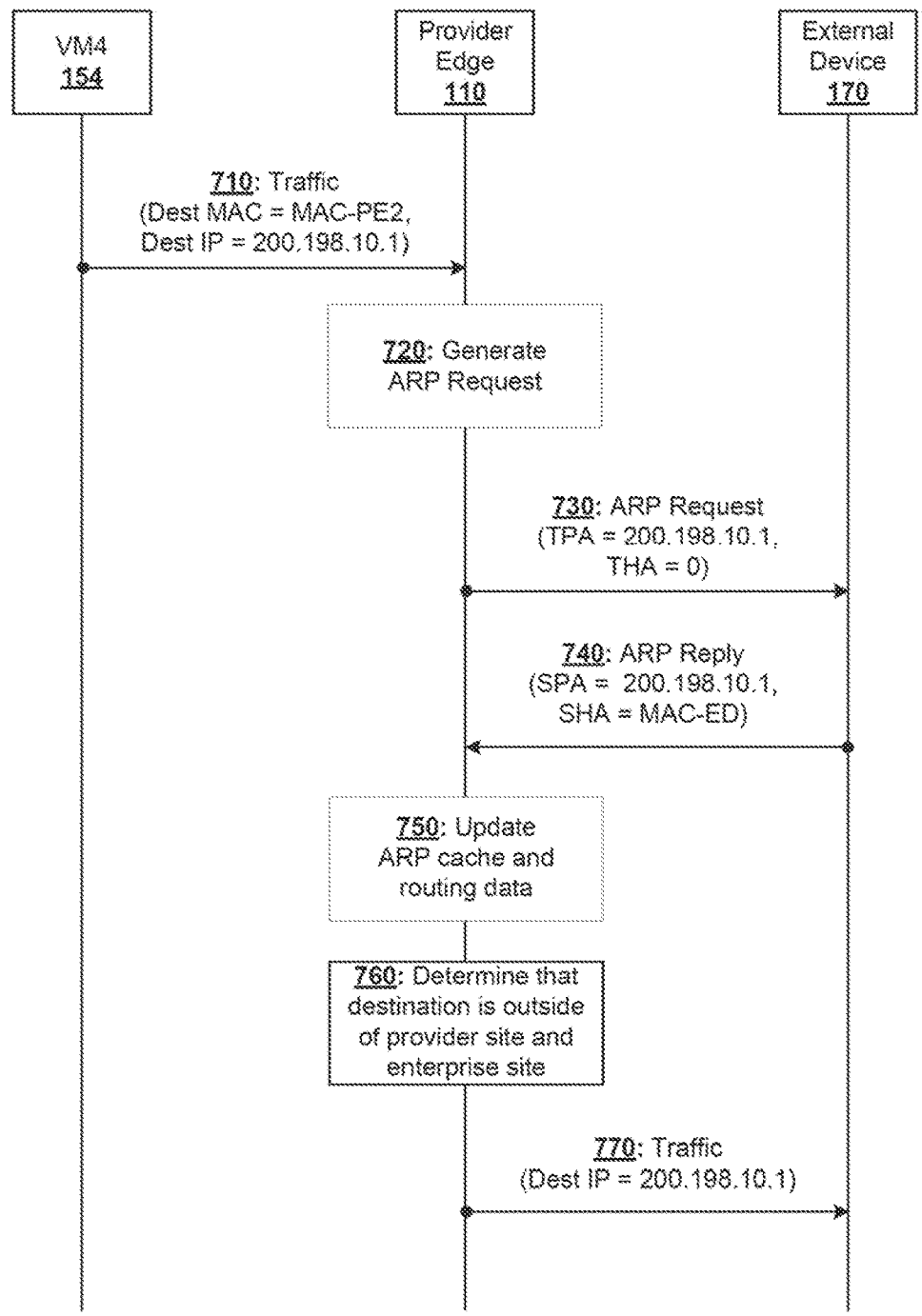
FIG. 7 is a flow diagram of an example process to perform traffic forwarding according to the second example traffic forwarding scenario in FIG. 2 after default gateway reconfiguration.

FIG. 7 is a flow diagram of example, process 700 to perform traffic forwarding according to the second example traffic forwarding scenario in FIG. 2 after default gateway reconfiguration. In this example, the implementation is illustrated using one or more operations, functions, or actions represented by 710 to 770. The various operations, functions, or actions may be combined, divided, and/or eliminated based upon the desired implementation. Example process 700 may be implemented to facilitate communication with external device 170 located outside of both provider site 102 and enterprise site 104.

At 710 in FIG. 7, "VM4" 154 wishes to send traffic (see 212 in FIG. 2) to external device 170 having IP address=200.198.10.1. Since external device 170 is on a different subnet (e.g., 200.198.10.0 instead of 192.168.20.0), "VM4" 154 sends the traffic to provider edge 110 (serving as its default gateway) for forwarding to external device 170. To reach the default gateway and eventually external device 170, the layer-2 header data of the traffic includes destination IP address=200.198.10.1 (i.e., IP address of external device 170), as well as destination MAC address=MAC-PE2 (i.e., MAC address of interface N4" 114) based on the association learned and stored in its ARP cache at 470 in FIG. 4.

At 720 in FIG. 7, provider edge 110 receives the traffic from "VM4" 154 for forwarding to external device 170. To be able to do so, provider edge 110 needs to know how to reach external device 170. For example, if the MAC address of external device 170 is recorded in a local ARP cache or routing data at provider edge 110, an ARP request message is generated to resolve TPA=200.198.10.1 (i.e., IP address of external device 170) to a MAC address. The ARP request message is broadcasted by encapsulating it with a layer-2 header with a broadcast destination MAC address.

Since the ARP request message is broadcasted, it will reach external device 170 via provider edge 110. At 730 in FIG. 7, external device 170 receives the ARP request message, checks that the TPA=200.198.10.1 in the ARP request message matches with its IP address, and responds with an ARP reply message. In the example in FIG. 7, the ARP reply message associates SPA=200.198.10.1 (i.e., IP address of external device 170) with SHA=MAC-ED (i.e. MAC address of external device 170).

The ARP reply message from external device 170 is sent to provider edge 110. At 740 and 750 in FIG. 7, provider edge 110 receives the ARP reply message and updates its ARP cache to store mapping data between 200.198.10.1 (i.e., IP address of external device 170) and MAC-ED (i.e., MAC address of external device 170) to the ARP cache. Provider edge 110 may also update and store any suitable routing data based on the ARP reply message, such as to store the IP address of external device 170 in association with an interface via which the ARP reply message is received from external device 170.

At 760 in FIG. 7, provider edge 110 is ready to forward the traffic from "VM4" 154 to external device 170. In this case, based on the routing data updated and stored at 750, provider edge 110 determines that external device 170 is not located within provider site 102 and enterprise site 104. As such, it is not necessary to forward the traffic using tunnel 130. At 770, provider edge 110 forwards the traffic to external device 170, thereby blocking the traffic from crossing tunnel 130 (see also 212 and 214 in FIG. 2).

Similar to the example in FIG. 6, it will be appreciated that it is not necessary to perform address resolution (see 720 to 750) every time traffic is sent by "VM4" 154 to external device 170. In particular, provider edge 110 may rely on its updated ARP cache and routing data (see 750) for subsequent traffic forwarding from "VM4" 154 to external device 170. The updated ARP cache and routing data may also be used for traffic forwarding from "VM3" 153 to external device 170. Entries of the ARP cache are generally associated with a timeout value and only removed after a period of inactivity (e.g., minutes, hours, etc.).

Further, similar to the example in FIG. 6, although the example in FIG. 7 shows provider edge 110 initiating the address resolution process at 720, "VM4" 154 may instead generates and sends the ARP request message to provider edge 110 before forwarding traffic to external device 170 at 710. In this case, provider edge 110 may similarly learn and store the mapping between 200.198.10.1 (i.e., IP address of external device 170) and MAC-ED (i.e., MAC address of external device 170) based on the ARP reply message from external device 170.

Traffic Forwarding to Enterprise Site

Figure 8:
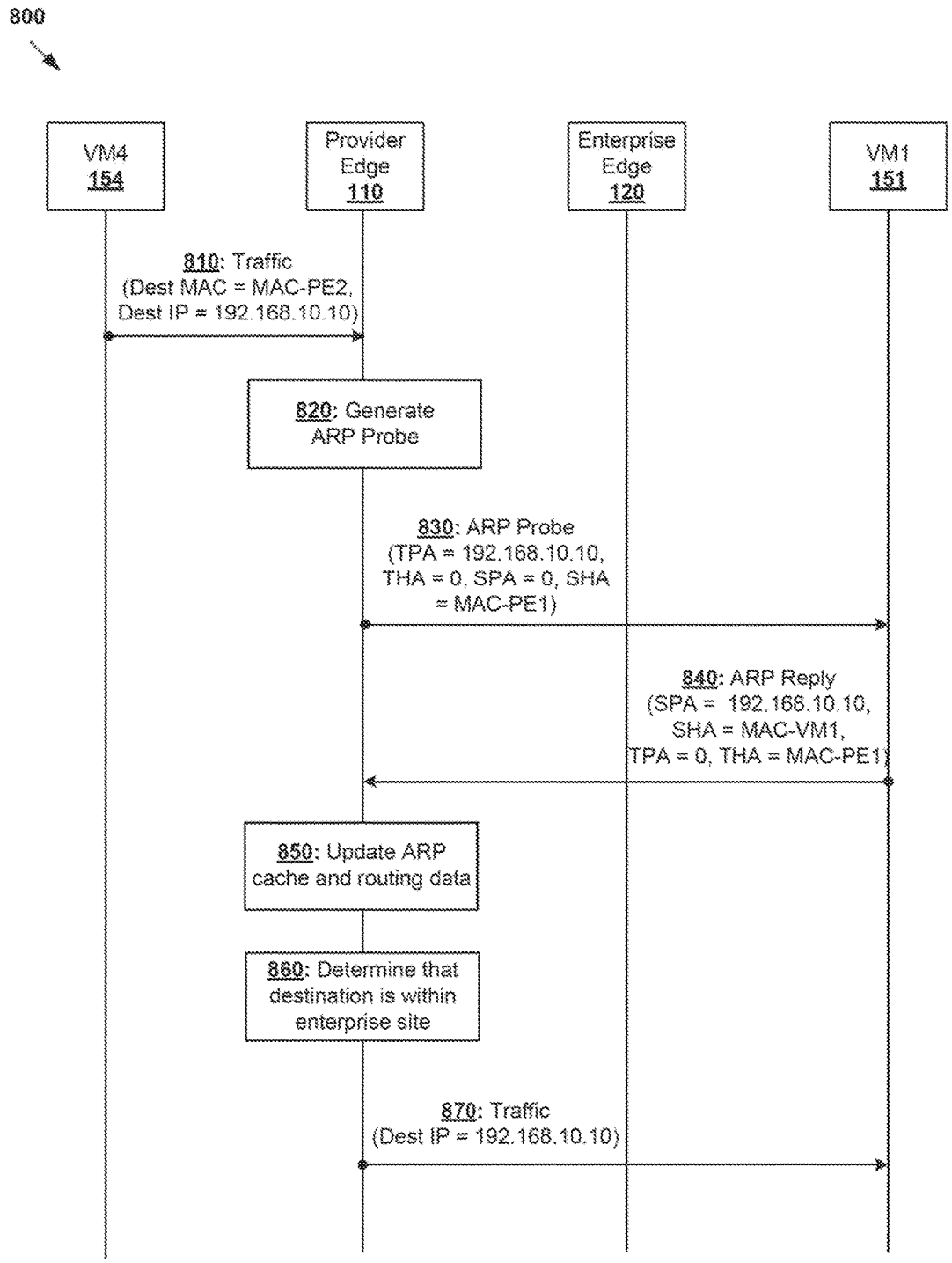
FIG. 8 is a flow diagram of an example process to perform traffic forwarding according to a third example traffic forwarding scenario after default gateway reconfiguration.

FIG. 8 is a flow diagram of example process 800 to perform traffic forwarding according to a third example forwarding scenario. In this example, the implementation is illustrated using one or more operations, functions, or actions represented by 810 to 870. The various operations, functions, or actions may be combined, divided, and/or eliminated based upon the desired implementation. Example process 800 may be performed to facilitate inter-site communication, such as traffic forwarding from "VM4" 154 within provider site 102 to "VM1" 151 within enterprise site 104.

At 810 in FIG. 8, "VM4" 154 wishes to send traffic to "VM1" 151 having IP address=192.168.10.10. Since "VM1" 151 is on a different subnet (e.g., 192.168.10.0), "VM4" 154 sends the traffic to provider edge 110 (serving as its default gateway) for forwarding to "VM1" 151. To reach the default gateway and eventually "VM1" 151, the header data of the traffic includes destination IP address=192.168.10.10 (i.e., IP address of "VM1" 151), as well as destination MAC address=MAC-PE2 (i.e., MAC address of interface "N4" 114) based on the association learned and stored in its ARP cache at 470 in FIG. 4.

At 820 in FIG. 8, provider edge 110 receives the traffic from "VM4" 154 for forwarding to "VM1" 151. Again, provider edge 110 performs an address resolution process to learn how to reach "VM1" 151 (e.g., not present in its ARP cache or routing data). However, instead of sending an ARP request message to enterprise site 102, provider edge 110 generates and broadcasts an ARP probe message (see 830) to reach "VM1" 151 via enterprise edge 120.

The ARP probe message differs from an ARP request message in that the SPA field is set to zero (i.e., SPA=0) rather than the sender's IP address (e.g., IP address of provider edge 110). In this case, any recipients (e.g., "VM1" 151, "VM2" 152, "VM3" 153 and enterprise edge 120) of the ARP probe message will not be able to resolve the sender's IP address (since SPA=0) to the sender's MAC address. This reduces their processing burden by not having to update their ARP cache. As will be described further using FIG. 9, this avoids ARP cache poisoning at the recipients (e.g., at "VM1" 151).

The intended recipient, i.e., "VM1" 151, will respond with an ARP reply message. At 840 in FIG. 8, in response to determining that the TPA=192.168.10.10 in the ARP probe message matches with its IP address, "VM1" 151 generates an ARP reply message that associates SPA=192.168.10.10 (i.e., IP address of "VM1" 151) with SHA=MAC-VM1 (i.e., MAC address of "VM1" 151). The ARP reply message is sent to provider edge 110 via enterprise edge 120.

At 850 in FIG. 8, provider edge 110 receives the ARP reply message and updates its ARP cache to store the mapping between SPA=192.168.10.10 (i.e., IP address of "VM1" 151) and SHA=MAC-VM1 (i.e., MAC address of "VM1" 151). Provider edge 110 may also update and store its routing data to record the interface (e.g., interface with tunnel 130) via which the ARP reply message is received from "VM1" 151 in association with IP address=192.168.10.10 (i.e., IP address of "VM1" 151).

At 860 in FIG. 8, provider edge 110 determines that destination "VM1" 151 is located within enterprise site 102 based on its updated ARP cache and/or routing data. In this case, it is necessary to forward the traffic using tunnel 130. As such, at 870, provider edge 110 forwards the traffic across tunnel 130 to reach "VM1" 151 via enterprise edge 120.

Similar to the examples in FIG. 6 and FIG. 7, it will be appreciated that it is not necessary to perform address resolution (see 820 to 850) every time traffic is sent by "VM4" 154 to "VM1" 151. In particular, provider edge 110 may rely on its updated ARP cache and routing data (see 850) for subsequent traffic forwarding from "VM4" 154 to "VM1" 151. The updated ARP cache and routing data may also be used for traffic forwarding from "VM3" 153 to "VM1" 151. Again, entries of the ARP cache are generally associated with a timeout value and removed after a period of inactivity (e.g., minutes, hours, etc.).

Further, similar to the examples in FIG. 6 and FIG. 7, the address resolution process at 820 may be initiated by "VM4" 154 instead of provider edge 110 before forwarding the traffic to "VW1" 151 at 810. In this case, provider edge 110 may similarly learn and store the mapping between 192.168.10.10 (i.e., IP address of "VM1" 151) and MAC-VM1 (i.e., MAC address of "VM1" 151) based on the ARP reply message from "VM1" 151. Although not shown, traffic forwarding from "VM4" 154 to "VM2" 152 may be performed according to the examples discussed here.

Figure 9:
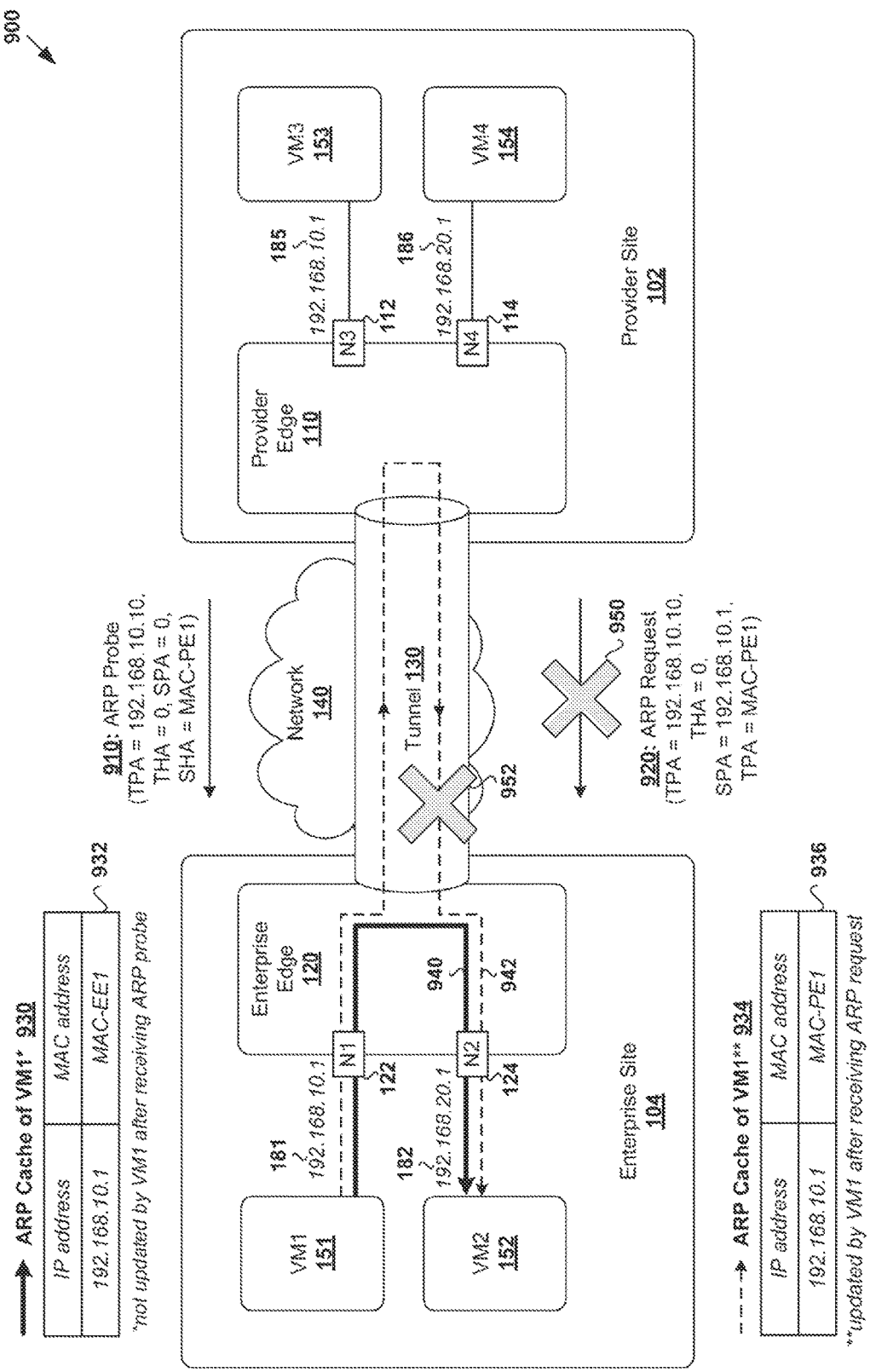
FIG. 9 is a schematic diagram of the example network in FIG. 1 illustrating usage of ARP probe message and blocking of ARP request message.

FIG. 9 is a schematic diagram of example network 100/900 in FIG. 1 illustrating usage of ARP probe message 910 and blocking of ARP request message 920. As explained using FIG. 1 and FIG. 2, IP address 185 (i.e., 192.168.10.1) of "N3" 112 at provider edge 110 corresponds to IP address 181 of 1" 122 at enterprise edge 120. Similarly, IP address 186 (i.e., 192.168.20.1) of "N4" 114 at provider edge 110 corresponds to IP address 182 of "N2" 124 at enterprise edge 120. For simplicity, external device 170 in FIG. 1 is not shown.

According to 820 and 830 in FIG. 8, ARP probe message 910 is sent instead of ARP request message 920 to avoid ARP cache poisoning at the recipient (e.g., "VM1" 151). For example, after receiving ARP probe message 910 with SPA=0 and SHA=MAC-PE1 (i.e., MAC address of provider edge 110), "VM1" 151 is unable to learn the association between SPA (since this is zero) and SHA in ARP probe message 910. As such, ARP cache 930 of "VM1" 151 will remain unchanged.

In the example in FIG. 9, ARP cache 930 already includes an association (see 932) between IP address=192.168.10.1 (i.e., IP address of enterprise edge 120) and MAC address=MAC-EE1 (i.e., MAC address of enterprise edge 120) of the default gateway of "VM1" 151. When "VM1" 151 communicates with destination "VM2" 152, traffic 940 (see bold line in FIG. 9) from "VM1" 151 will be forwarded to "VM2" 152 via enterprise edge 120 (i.e., its default gateway).

In contrast, if ARP request message 920 is sent by provider edge 110 across tunnel 130 to resolve TPA=192.168.10.10 (i.e., IP address of "VM1" 151), "VM1" 151 will learn the association between SPA=192.168.10.1 (i.e., IP address of provider edge 110) and SHA=MAC-PE1 (i.e., MAC address of provider edge 110) in ARP request message 920. In this case, "VM1" 151 will update its ARP cache (see 934) by replacing association 932 between 192.168.10.1 and MAC-EE1 with updated association 936 between 192.168.10.1 and MAC-PE1 Since provider edge 110 and enterprise edge 120 have an IP address conflict (i.e., both use the same IP address=192.168.10.1), this has the adverse effect of reconfiguring provider edge 110 as the new default gateway of "VM1" 151.

The updated ARP cache 934 and new default gateway settings will result in non-optimal traffic forwarding. For example, when "VM1" 151 communicates with destination "VM2" 152, traffic 942 (see dashed line in FIG. 9) from "VM1" 151 will now have to cross tunnel 130 twice (similar to the problem described in FIG. 1). To reach its new default gateway (i.e., provider edge 110), traffic 942 is first sent across tunnel 130 via enterprise edge 120. Since destination "VM2" 152 is not within provider site 102, provider edge 110 redirects traffic 942 across tunnel 130 back to enterprise edge 120 to reach "VM2" 152. Similar to the second traffic forwarding scenario in FIG. 2, any traffic from "VM1" 151 to external device 170 (not shown for simplicity) will also be forwarded via its new default gateway of provider edge 110 instead of enterprise edge 120 on the same site as "VM1" 151.

As such, the use of ARP probe message 910 according to examples of the present disclosure avoids the above inefficient traffic forwarding that leads to bandwidth wastage and higher latency for traffic 942. The use of ARP probe message 910 therefore has the effect of "blocking" (see 950) ARP request message 920 across tunnel 130, and subsequent "blocking" (see 952) of unnecessary traffic across tunnel 130. This facilitates egress optimization where traffic forwarding is performed on the shortest path between a source and a destination; and where possible, traffic forwarding within the local domain via enterprise edge 120) will be given preference over traffic forwarding to the remote domain via provider edge 110).

The above examples can be implemented by hardware (including hardware logic circuitry), software or firmware or a combination thereof. For example, provider edge 110 and enterprise edge 120 may be implemented by any suitable network device or computer system, which may include processor and memory that may communicate with each other via a bus, etc. The network device may include a non-transitory computer-readable medium having stored thereon instructions that, when executed by the processor, cause the processor to perform processes described herein with reference to FIG. 1 to FIG. 9.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method for a first edge device to perform traffic forwarding in a network with geographically dispersed first site and second site, wherein the method comprises:
   for a workload migrated from the second site to the first site, reconfiguring, by the first edge device, the first edge device located at the first site as a default gateway of the workload from a second edge device located at the second site, wherein the first edge device differs from the second edge device, by:
   updating an Internet Protocol (IP) address of a first interface of the first edge device to match an IP address of a second interface of the second edge device in response to the migration of the workload from the second site to the first site, the IP address of the second interface of the second edge device being a default gateway IP address for the workload; and
   causing the workload to learn an association between the default gateway IP address and a MAC address associated with the first edge device;
   receiving, from the workload, traffic for forwarding to a destination, wherein the traffic is addressed by the workload to the MAC address associated with the first edge device based on the learned association; and
   in response to determination that the destination is not within the second site, forwarding the received traffic to the destination without using the second edge device.

2. The method of claim 1, wherein reconfiguring the default gateway of the workload further comprises:
   receiving, from the workload, a request message to resolve the default gateway IP address;
   determining that the default gateway IP address corresponds with the updated IP address of the first interface of the first edge device;
   generating a reply message that includes the association between the default gateway IP address and the MAC address associated with the first edge device; and
   sending, to the workload, the reply message.

3. The method of claim 1, wherein, prior to forwarding the received traffic to the destination, the method further comprises:
   generating a request message to resolve a destination IP address associated with the destination; and
   sending the request message within the first site and/or to outside of both the first site and the second site.

4. The method of claim 3, wherein the method further comprises:
   receiving, from the destination, a reply message that resolves the destination IP address in the request message to a MAC address associated with the destination;
   based on the reply message and/or routing data stored based on the reply message, determining that the destination of the received traffic is within the first site or outside of both the first site and the second site.

5. The method of claim 1, wherein the method further comprises:
   in response to determination that the destination is within the second site, forwarding the received traffic to the destination via the second edge device.

6. The method of claim 5, wherein, prior to forwarding the received traffic to the destination, the method further comprises:
   generating a probe message to resolve a destination IP address associated with the destination, wherein the probe message includes a zero source IP address; and
   sending the probe message to the second site via the second edge device.

7. The method of claim 6, wherein the method further comprises:
   receiving, from the destination via the second edge device, a reply message that resolves the destination IP address in the probe message to a MAC address associated with the destination; and
   based on the reply message, determining that the destination is within the second site.

8. The method of claim 1, wherein the updating an IP address of a first interface of the first edge device to match an address of a second interface of the second edge device in response to the migration of the workload from the second site to the first site further comprises:
   updating the IP address of the first interface of the first edge device, which is assigned by the first edge device, with the default gateway IP address, wherein the IP address and the default gateway IP address are different.

9. A non-transitory computer-readable storage medium that includes a set of instructions which, in response to execution by a processor of a first edge device, cause the processor to perform a method of traffic forwarding in a network with geographically dispersed first site and second site, wherein the method comprises:
   for a workload migrated from the second site to the first site, reconfiguring, by the first edge device, the first edge device located at the first site as a default gateway of the workload from a second edge device located at the second site, wherein the first edge device differs from the second edge device, by:
   updating an Internet Protocol (IP) address of a first interface of the first edge device to match an IP address of a second interface of the second edge device in response to the migration of the workload from the second site to the first site, the IP address of the second interface of the second edge device being a default gateway IP address for the workload; and
   causing the workload to learn an association between the default gateway IP address and a MAC address associated with the first edge device;
   receiving, from the workload, traffic for forwarding to a destination, wherein the traffic is addressed by the workload to the MAC address associated with the first edge device based on the learned association; and
   in response to determination that the destination is not within the second site, forwarding the received traffic to the destination without using the second edge device.

10. The non-transitory computer-readable storage medium of claim 9, wherein reconfiguring the default gateway of the workload further comprises:
    receiving, from the workload, a request message to resolve the default gateway IP address;

determining that the default gateway IP address corresponds with the updated IP address of the first interface of the first edge device;
generating a reply message that includes the association between the default gateway IP address and the MAC address associated with the first edge device; and
sending, to the workload, the reply message.

11. The non-transitory computer-readable storage medium of claim 9, wherein, prior to forwarding the received traffic to the destination, the method further comprises:
generating a request message to resolve a destination IP address associated with the destination; and
sending the request message within the first site and/or to outside of both the first site and the second site.

12. The non-transitory computer-readable storage medium of claim 11, wherein the method further comprises:
receiving, from the destination, a reply message that resolves the destination IP address in the request message to a MAC address associated with the destination; and
based on the reply message and/or routing data stored based on the reply message, determining that the destination of the received traffic is within the first site or outside of both the first site and the second site.

13. The non-transitory computer-readable storage medium of claim 9, wherein the method further comprises:
in response to determination that the destination is within the second site, forwarding the received traffic to the destination via the second edge device.

14. The non-transitory computer-readable storage medium of claim 13, wherein, prior to forwarding the received traffic to the destination, the method further comprises:
generating a probe message to resolve a destination IP address associated with the destination, wherein the probe message includes a zero source IP address; and
sending the probe message to the second site via the second edge device.

15. The non-transitory computer-readable storage medium of claim 14, wherein the method further comprises:
receiving, from the destination via the second edge device, a reply message that resolves the destination IP address in the probe message to a MAC address associated with the destination; and
based on the reply message, determining that the destination is within the second site.

16. A first edge device configured to perform traffic forwarding in a network with geographically dispersed first site and second site, the first edge device comprising:
a processor; and
a non-transitory computer-readable medium having stored thereon instructions that, when executed by the processor, cause the processor to:
reconfigure, for a workload migrated from the second site to the first site, the first edge device located at the first site as a default gateway of the workload from a second edge device located at the second site, wherein the first edge device differs from the second edge device, by:
updating an Internet Protocol (IP) address of a first interface of the first edge device to match an IP address of a second interface of the second edge device in response to the migration of the workload from the second site to the first site, the IP address of the second interface of the second edge device being a default gateway IP address for the workload; and
causing the workload to learn an association between the default gateway IP and a MAC address associated with the first edge device;
receive, from the workload, traffic for forwarding to a destination, wherein the traffic is addressed by the workload to the MAC address associated with the first edge device based on the learned association; and
in response to determining that the destination is not within the second site, forward the received traffic to the destination without using the second edge device.

17. The first edge device of claim 16, wherein instructions for reconfiguring the default gateway of the workload further cause the processor to:
receive, from the workload, a request message to resolve the default gateway IP address;
determine that the default gateway IP address corresponds with the updated IP address of the first interface of the first edge device;
generate a reply message that includes the association between the default gateway IP address and the MAC address associated with the first edge device; and
send, to the workload, the reply message.

18. The first edge device of claim 16, wherein, prior to forwarding the received traffic to the destination, the instructions further cause the processor to:
generate a request message to resolve a destination IP address associated with the destination; and
send the request message within the first site and/or to outside of both the first site and the second site.

19. The first edge device of claim 18, wherein the instructions further cause the processor to:
receive, from the destination, a reply message that resolves the destination IP address in the request message to a MAC address associated with the destination; and
based on the reply message and/or routing data stored based on the reply message, determine that the destination of the received traffic is within the first site or outside of both the first site and the second site.

20. The first edge device of claim 16, wherein the instructions further cause the processor to:
in response to determination that the destination is within the second site, forward the received traffic to the destination via the second edge device.

21. The first edge device of claim 20, wherein, prior to forwarding the received traffic to the destination, the instructions further cause the processor to:
generate a probe message to resolve a destination IP address associated with the destination, wherein the probe message includes a zero source IP address; and
send the probe message to the second site via the second edge device.

22. The first edge device of claim 21, wherein the instructions further cause the processor to:
receive, from the destination via the second edge device, a reply message that resolves the destination IP address in the probe message to a MAC address associated with the destination; and
based on the reply message, determine that the destination is within the second site.

* * * * *